United States Patent [19]

Okura et al.

[11] Patent Number: 4,976,508
[45] Date of Patent: Dec. 11, 1990

[54] TAPE CORE TYPE COATED OPTICAL FIBER

[75] Inventors: Toshihiko Okura; Kouji Hirao; Tetsuaki Watanabe; Kouji Kashihara, all of Kanagawa, Japan

[73] Assignee: Sumitomo Electric Industries, Ltd., Osaka, Japan

[21] Appl. No.: 393,938

[22] Filed: Aug. 15, 1989

[30] Foreign Application Priority Data

Aug. 23, 1988 [JP] Japan .................. 63-208667

[51] Int. Cl.$^5$ .................................... G02B 6/44
[52] U.S. Cl. ........................................ 350/96.23
[58] Field of Search ............................ 350/96.23

[56] References Cited

U.S. PATENT DOCUMENTS 4,457,583  7/1984  Mayr et al. ............... 350/96.23
4,629,286  12/1986 Fuse et al. ................ 350/96.23
4,725,453  2/1988  Nakasone et al. ......... 350/96.23 X
4,744,622  5/1988  Cherry et al. ............ 350/96.23 X
4,767,183  8/1988  Martin ...................... 350/96.23
4,795,234  1/1989  Nakasone et al. ......... 350/96.23 X
4,840,454  6/1989  Mayr ........................ 350/96.23
4,929,047  5/1990  Dubots et al. ............ 350/96.23

Primary Examiner—William L. Sikes
Assistant Examiner—Phan T. Heartney
Attorney, Agent, or Firm—Cushman, Darby & Cushman

[57] ABSTRACT

A tape core type coated optical fiber containing therein a plurality of single optical fibers, which comprises a housing for housing the tape core type coating optical fiber, the tape core type coated optical fiber branches into a plurality of single fibers inside the housing, the housing comprises a plurality of branches through which each of the single fiber passes.

19 Claims, 3 Drawing Sheets

FIG. 4A   FIG. 4B   FIG. 4C
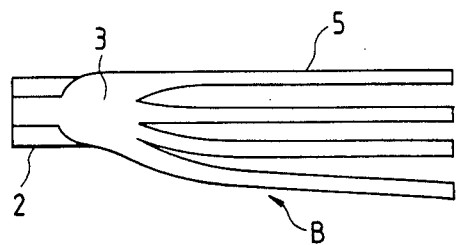
FIG. 5A
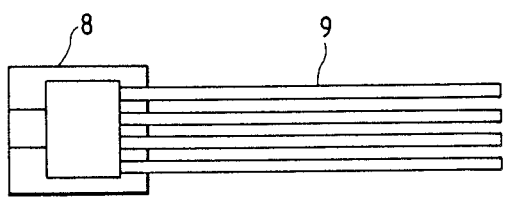
FIG. 5B
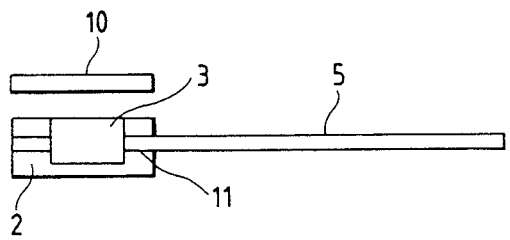
FIG. 6
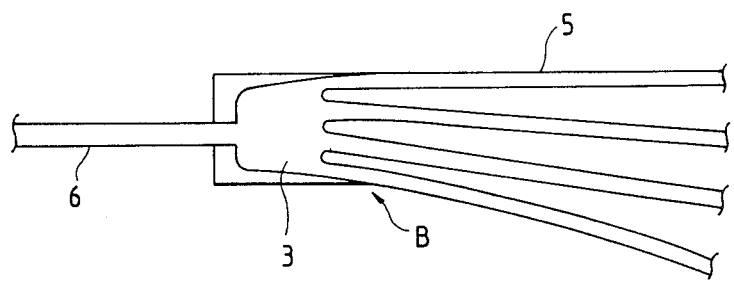

TAPE CORE TYPE COATED OPTICAL FIBER

FIELD OF THE INVENTION

The present invention relates generally to an optical fiber, and more particularly to a branching portion of a tape core type coated optical fiber which branches optical fiber bundle into single fibers at its end portion.

BACKGROUND OF THE INVENTION

There has been developed a conventional optical fiber cord as shown in FIG. 1. The conventional optical fiber cord shown in FIG. 1 is provided with a tape core type coated fiber 1, a reinforcing member 12, a reinforcing sheath 13, a single fiber 4, a branching portion protecting plate 15, a reinforcing housing 17, a resin 16, and an optical fiber connector 7. The tape core type coated fiber 1 is adhered to the branching portion protecting plate 15.

Further, there is another conventional coated optical fiber branching portion of a five-to-one fiber conversion cord shown in 1988-Spring National Meeting B-599 of the Institute of Electronics, Information and Communication Engineers of Japan.

According to the conventional optical fiber cord shown in FIG. 1, the tape core type coated fiber 1 branching on the branching portion protecting plate 15 is provisionally fixed to the branching portion protecting plate 15 through an adhesive, and then, each of the tape core type coated fiber 1 and the single fibers 4 is coated with the reinforcing sheath 13, an end of the sheath 13 and the connection portion between the tape core type coated fiber 1 and the single fibers 4 are covered with the reinforcing housing 17, and the resin 16 is filled in the reinforcing housing 17. Such an optical fiber cord would cause a drawback that stress is exerted onto the tape core type coated fiber 1 and the single fibers 4 in filling the resin and in hardening the resin to thereby increase undesirable light transmission loss.

Further, the conventional optical fiber cord would suffer from a problem that the tape core type coated fiber 1 and the single fibers 4 are subject to stress by thermal expansion of the resin 16 when an environmental temperature varies since they are molded with the resin 16, so that the light transmission loss may increase.

Moreover, there would be raised a further problem that the work for fixing the branching portion of the tape core type coated fiber 1 to the protecting plate 15 is fine work and poor in workability and, therefore, the light transmission loss may increase if the setting is not well.

There has been a still further problem that since the branching portion has such a basic configuration as described above, it is necessary to provide the protecting plate 15 when the tape core type coated fiber 1 is branched into the single fibers 4, and it is impossible to provide a mere branching portion of the single fibers 4 of the tape core type coated fiber 1.

SUMMARY OF THE INVENTION

In view of the above-noted drawbacks and problems accompanying the conventional device, an object of the present invention is to provide a branching portion of a tape core type coated fiber, in which the single fibers branching from the tape core type coated fiber do not directly touch an adhesive or resin, no stress is exerted on the optical fibers in the process of hardening the adhesive or resin, no stress is exerted on the optical fibers even when the resin or the like is thermally expanded in use due to a change in an environmental temperature, and the light transmission loss does not increase.

The foregoing and other objects have been achieved by the provision of a branching portion of a tape core type coated optical fiber according to the present invention described in detail hereinbelow.

BRIEF DESCRIPTION OF THE DRAWINGS

FIG. 4A is a view showing a multi-branch pipe for forming the branching portion of FIG. 2;

FIGS. 4B and 4C are cross sectional views showing two arrangements of a configuration of a multi branch pipe;

FIG. 5A is a plan view of a multi-branch pipe arrangement different from that of FIG. 4A;

FIG. 5B is a side view of the multi-branch pipe arrangement shown in FIG. 5B;

FIG. 6 is a view showing a multi-branch pipe for forming branching portion of FIG. 3;

DESCRIPTION OF THE PREFERRED EMBODIMENT

The branching portion of the tape core type coated optical fiber of the present invention will now be described with reference to accompanying drawings.

Figure 1:
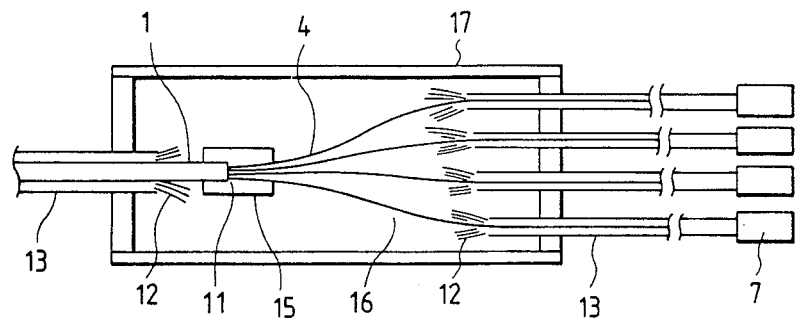
FIG. 1 is a sectional view showing a conventional optical fiber cord.
Figure 2:
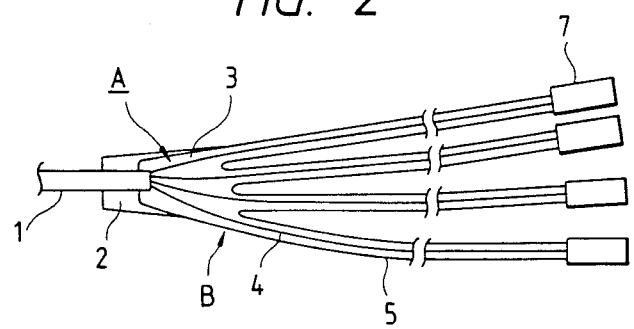
FIG. 2 is a sectional view of an optical fiber branching portion according to a first embodiment of the present invention.

FIG. 2 shows a first embodiment of a branching portion of a tape core type coated optical fiber (hereinafter simply referred to an "optical fiber branching portion") A. The optical fiber branching portion shown in FIG. 2 is provided with a tape core type coated fiber 1, a fixing portion 2 for fixing the tape core type coated fiber 1, a branch housing space 3, a single fiber 4, a single-fiber protecting sheath 5, an optical connector 7, and a multi-branch pipe B.

Figure 3:
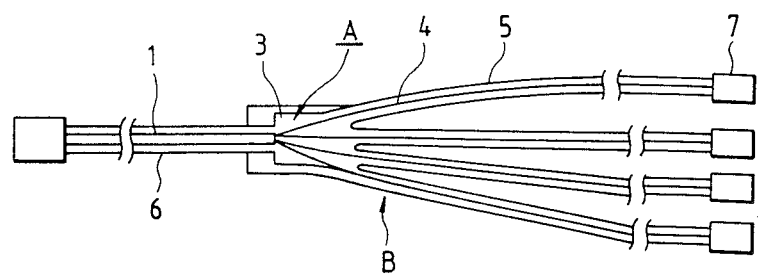
FIG. 3 is a view showing an optical fiber branching portion according to a second embodiment of the invention.

FIG. 3 shows a second embodiment of a branching portion of a tape core type coated optical fiber according to the present invention, in which the tape core type coated fiber 1 is not fixed by the fixing portion instead the fiber 1 is housed in a protecting member 6 such as a tube or the like.

Referring to FIGS. 4 through 6, the above-mentioned multi-branch pipe B will be described.

FIG. 4A is a principle view of the multi-branch pipe B employed in the first embodiment shown in FIG. 2, which pipe comprises the single-fiber protecting sheath 5, the tape core type coated fiber fixing portion 2, and the branch housing space 3. FIGS. 4B and 4C are cross sectional views showing arrangements of the configuration of single-fiber protecting sheath 5. That is, four protecting sheaths 5 form in a line in the arrangement of FIG. 4B, and in two lines and two columns in the arrangement of FIG. 4C.

FIGS. 5A and 5B show an example of a method of assembling the multi-branch pipe B arranged such that tubes 9 are inserted into a ported box 8 opened at its one side and a cover 10 is provided for covering the open side of the ported box 8. FIGS. 5A and 5B are a plan view and a side view of the example, respectively.

FIG. 6 is a sectional view showing the multi-branch pipe B employed in the second embodiment shown in FIG. 3, in which there is provided the tape core type coated fiber protecting member 6, a branch housing space 3, and a single-fiber protecting sheath 5.

Figure 7:
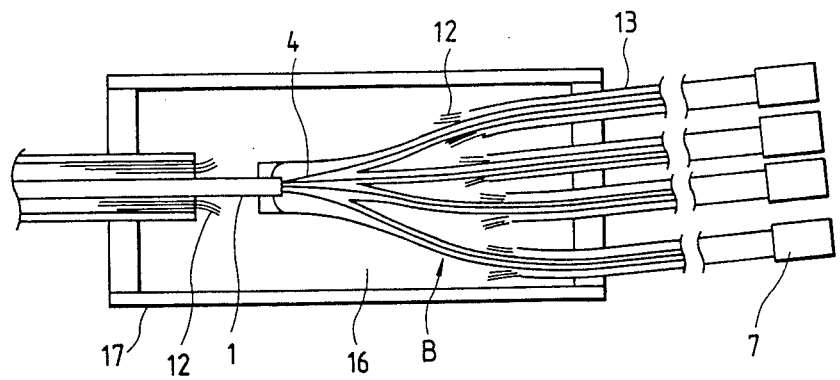
FIG. 7 is a sectional view showing an optical fiber cord applied to the present invention.

FIG. 7 is a sectional view showing an example of an optical fiber cord applied to a branching portion of a tape core type coated fiber according to the present invention. The optical fiber cord shown in FIG. 7 has a configuration in which each of a tape core type coated fiber 1 and single fibers 4 is coated with a protecting sheath 13 containing therein a reinforcing member 12. An end of the protecting sheath 13 together with the multi-branch pipe B is contained in the reinforcing housing 17 filled with a resin 16.

Figure 8:
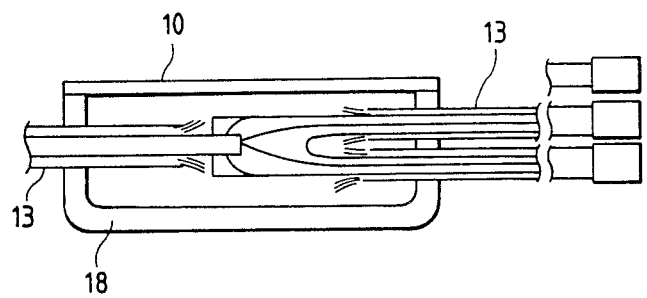
FIG. 8 is a sectional view showing another optical fiber cord applied to the present invention.

Although the reinforcing housing 17 is pipe-like in FIG. 7, it is applicable to facilitate assembling of the inside by such a configuration that the reinforcing housing 17 is replaced by an one-side opening lunch box type reinforcing box 18 provided with a cover 10 as shown in FIG. 8.

The tape core type coated fiber branching portion A shown in FIG. 2 is configured such that the tape core type coated fiber 1 branched at its forward end into single fibers is inserted from the tape core type coated fiber fixing portion 2 of the multi-branch pipe B shown in FIG. 4A into the protecting sheath 5 of the branching single fibers 4, and the tape core type coated fiber 1 is fixed at the tape core type coated fiber fixing portion 2, so that the branching portion A can be assembled without giving excessive force to the single fibers 4.

Further, the branching portion A shown in FIG. 3 can be housed in the branching portion housing space 3 without fixing the tape core type coated fiber 1 at the branching portion A as shown in FIG. 6. Thus, the freedom of the tape core type coated fiber increases and the light transmission loss can sufficiently be minimized.

Further, the optical fiber cord branching portion shown in FIG. 7 has a configuration in which the tape core type coated fiber branch portions made as described above are coated with the respective sheaths 13 and the reinforcing housing 17, and then the resin 16 is filled in the reinforcing housing 17. Accordingly, the resin 16 never directly touches the single fibers 4.

The optical fiber cord branching portion shown in FIG. 8 is similar in advantage to that shown in FIG. 7.

Figure 9:
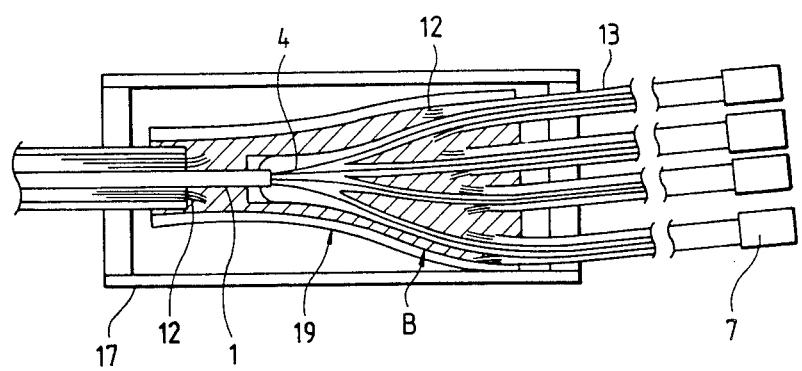
FIG. 9 is a sectional view showing another arrangement of the optical fiber cord according to the invention.

FIG. 9 shows another arrangement of the optical fiber cord branching portion according to the invention. This arrangement is similar to the arrangement shown in FIG. 7. However, in this arrangement, the reinforcing housing 17 is not filled with a resin. Instead, the branching portion of the optical fiber cord, an end part of the tape and an end part of each of the sheath 13 are fixedly covered with a heat-shrinkable tubing 19. This arrangement is advantageous in that the manufacturing time is shortened relative to the case in which a resin is filled in the housing 17. A heat-melting adhesion may be applied to the inner periphery of the heat-shrinkable tubing 19 thereby firmly fixing the branching portion, end part of the tape and end part of the sheath to one another.

In the above-described embodiments, the multi-branch pipe has four branches. However, the invention is not limited thereto or thereby. That is, the multi-branch pipe may have a plurality of branches other than four.

As described above, according to the present invention, the single fibers branching from an end of the tape core type coated fiber never touch directly the adhesive or resin, so that stress is never exerted onto the optical fibers in the process of hardening the resin or adhesive, and the light transmission loss never increases in the manufacturing process.

What is claimed is:

1. A tape core type coated optical fiber arrangement including a plurality of single optical fibers, comprising:
    a housing;
    a tape core type coated optical fiber member comprising a plurality of single optical fibers, the plurality of single fibers branching out from said tape core type coated optical fiber member inside said housing, said housing comprising a plurality of single fiber passages through which said single fibers pass such that each single fiber is encased by a single fiber passage only after branching out.

2. The tape core type coated optical fiber arrangement of claim 1, wherein said tape core type coated optical fiber arrangement is fixed to said housing at one end thereof.

3. The tape core type coated optical fiber arrangement of claim 1, wherein said housing comprises a pipe means in which the tape core type coated optical fiber arrangement freely passes, and said pipe means extends from an end of said housing.

4. The tape core type coated optical fiber arrangement of claim 1, wherein said housing comprises a ported box and a plurality of tubes in which said single fibers pass.

5. The tape core type coated optical fiber arrangement of claim 4, wherein said ported box is provided with a cover.

6. The tape core type coated optical fiber arrangement of claim 3, wherein said pipe means contains therein a reinforcing means.

7. The tape core type coated optical fiber arrangement of claim 1, wherein each passage is provided with an outer cover containing therein a reinforcing means.

8. The tape core type coated optical fiber arrangement of claim 1, wherein the tape core type coated optical fiber arrangement and said housing is accommodated by a second housing.

9. The tape core type coated optical fiber arrangement of claim 8, wherein said second housing is filled with a resin.

10. The tape core type coated optical fiber arrangement of claim 8, wherein said second housing is provided with a cover.

11. The tape core type coated optical fiber arrangement of claim 8, wherein said second housing is of a one sided opening lunch box type.

12. The tape core type coated optical fiber arrangement of claim 1, wherein said single optical fibers are connected to optical fiber connectors.

13. The tape core type coated optical fiber arrangement of claim 1, wherein said housing comprises four passages.

14. The tape core type coated optical fiber arrangement of claim 13, wherein said four branches of said housing form in a line.

15. The tape core type coated optical fiber arrangement of claim 13, wherein said four branches of said housing form in two lines and two columns.

16. The tape core type coated optical fiber arrangement of claim 1, wherein said housing comprises a multi-passage pipe.

17. The tape core type coated optical fiber arrangement of claim 7, wherein said pipe means contains therein a reinforcing means, and said pipe means, said passage and said outer cover are covered with a heat-shrinkable means.

18. The tape core type coated optical fiber arrangement of claim 17, wherein an inner periphery of said heat-shrinkable means is applied with an adhesive.

19. The tape core type coated optical fiber arrangement of claim 18, wherein said adhesive is of a heat-melting type.

* * * * *